UNITED STATES PATENT OFFICE.

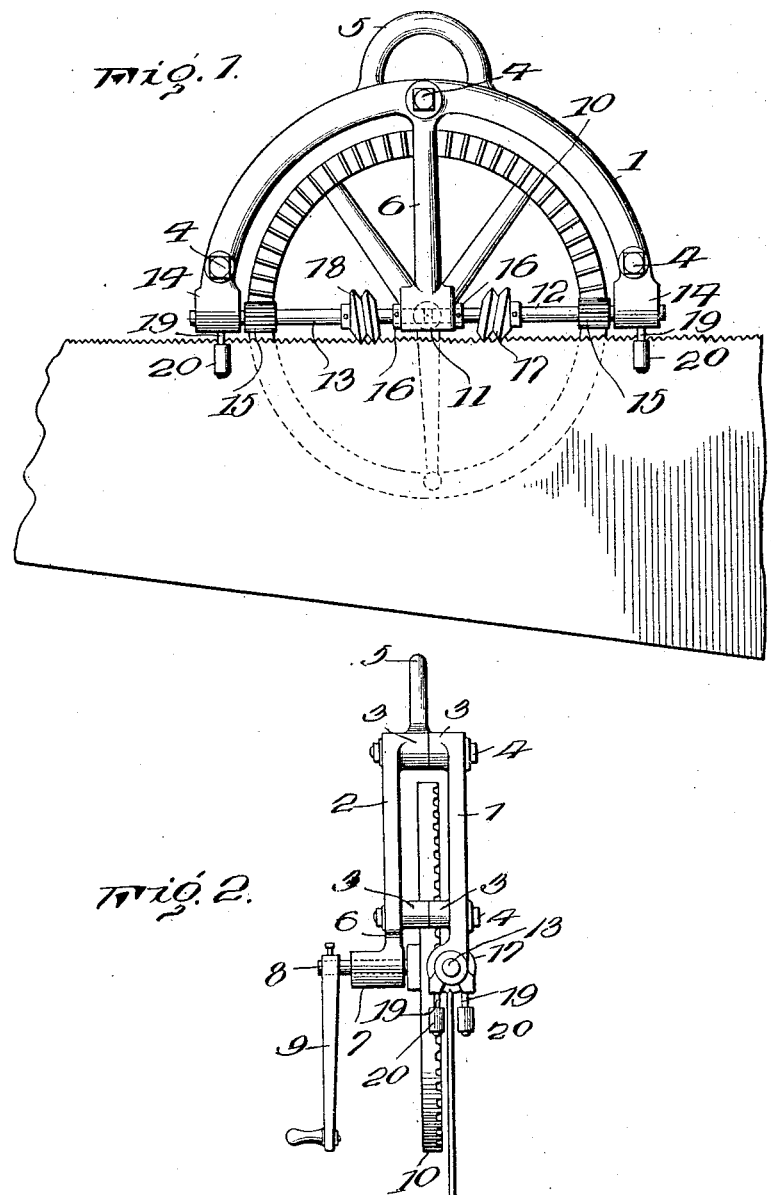

HENRY R. WILKINSON, OF SULPHUR BLUFF, TEXAS, ASSIGNOR OF ONE-HALF TO ROBERT C. HARRIS, OF SULPHUR BLUFF, TEXAS.

SAW-FILING MACHINE.

1,198,801.　　　Specification of Letters Patent.　　Patented Sept. 19, 1916.

Application filed January 8, 1916. Serial No. 71,023.

*To all whom it may concern:*

Be it known that I, HENRY R. WILKINSON, a citizen of the United States, residing at Sulphur Bluff, in the county of Hopkins and State of Texas, have invented certain new and useful Improvements in Saw-Filing Machines, of which the following is a specification.

This invention relates to saw filing machines and has for its object the provision of a simple, inexpensive and efficient device which may be readily applied to a saw and manually manipulated to rapidly file the teeth thereof.

The invention seeks more specifically to provide a device which will impart a uniform shape to all the teeth and which may be quickly adjusted along the saw as the teeth are successively treated.

An apparatus embodying my invention is illustrated in the accompanying drawing and the invention resides in certain novel features which will be hereinafter first fully described and then more particularly pointed out in the claim following the description.

In the accompanying drawing: Figure 1 is a side view of my improved saw filing machine showing the same applied to a saw; Fig. 2 is an end elevation of the same.

In carrying out my invention, I provide a frame consisting of two arcuate members 1 and 2 provided on their opposed faces with offsets or bosses 3 through which fastening bolts 4 are inserted to secure the members rigidly together, said bosses or lugs serving to space the members apart so that they may accommodate the driving gear wheel. One of the members is provided at its top with a loop or handle 5 by which the device may be held in position upon a saw when in use. Both members are provided with a central radial arm 6 having a bearing at its inner or lower end to receive shafts carrying the operating parts. In the present arrangement, the arm 6 carried by the frame member 2 is equipped with a bearing 7 at its lower end which receives the driving shaft 8, said driving shaft being equipped at its outer end with a crank or other handle 9 and having the driving gear wheel 10 secured upon its inner end. The arm 6 of the frame member 1 is provided at its inner or lower end with a sleeve or bearing 11 in the ends of which are fitted shafts 12 and 13 which extend longitudinally and when in use will lie directly over the saw teeth, and in the plane of the saw. The outer ends of these shafts 12 and 13 are fitted in bearings 14 provided at the ends of the frame member 1 and upon the said shafts are secured pinions 15 which mesh with the driving gear wheel 10. Near the inner ends of the said shafts, I secure collars 16 which engage the ends of the bearing 11 and thereby maintain the said shafts in proper position against longitudinal shifting, while upon the said shafts, adjacent the inner ends thereof, I secure rotary filing members 17 and 18. These filing members are rotary disks resembling screws and having tapered or beveled annular abrading edges which fit against the edges of the saw teeth and, when rotated, file the teeth to the proper shape. The filing members resemble screws in form and engage between alternate teeth, automatically feeding themselves along the saw while filing the same. The inclination of the working edge of one filing member is opposed to the inclination on the other filing member so that while the members work on opposite sides of the teeth and rotate in opposite directions, the feeding action will be the same.

At the ends of the frame member 1, I provide depending pins 19 carrying rollers 20 which may have rubber surfaces and are arranged so as to bear against the opposite faces of the saw and thereby guide the device while it is in use.

It is thought the operation and advantages of my improved saw-filing machine will be readily understood from the foregoing description taken in connection with the accompanying drawings. The device is placed in position over the saw blade which may be secured in any convenient or suitable clamp and the rollers 20 caused to bear against opposite sides of the saw, as shown in Fig. 2. The filing members 17 and 18 are engaged within the saw teeth and the handle 9 then rotated, the device being held steadily to and upon the saw by grasping the handle 5. The movement of the handle 9 will, of course, be transmitted to the driving shaft 8 and through said shaft to the driving gear 10 which, in turn, will actuate the pinions 15 so as to rotate the shafts 12 and 13 in opposite directions. The rotation of the shafts 12 and 13 will cause the filing members to act upon the edges of the saw teeth and thereby sharpen the same and give them the desired shape. The filing members will be properly adjusted, of course, to fit the saw teeth before being set in motion.

The device is exceedingly simple in the construction and arrangement of its parts and may be instantly fitted to or removed from the saw.

Having thus described the invention, what is claimed as new is:

A saw-filing machine comprising similar arcuate members secured together in spaced relation, bearings provided at the ends of one of the said members, a bearing provided at the center of said member in alinement with the first-mentioned bearings, shafts fitted in said bearings, filing members secured upon said shafts near the inner ends of the same pinions on said shafts near the outer ends of the same, a bearing upon the other frame member at the center of the same disposed at an angle to the bearings upon the first-mentioned frame member, a driving shaft mounted in the said last-mentioned bearing, a driving gear on the inner end of said shaft housed by the frame members and engaging the pinions on the outer ends of the said first-mentioned shafts, an operating handle upon the outer end of the driving shaft, pins depending from the ends of the frame member provided with the alined bearings, and rollers carried by said pins below the said frame member to bear upon the opposite faces of a saw.

In testimony whereof, I affix my signature.

HENRY R. WILKINSON. [L. S.]

Copies of this patent may be obtained for five cents each, by addressing the "Commissioner of Patents. Washington, D. C."